(12) United States Patent
Kilgert et al.

(10) Patent No.: US 6,196,374 B1
(45) Date of Patent: Mar. 6, 2001

(54) CLEANING DEVICE FOR A CURVED CONVEYOR BELT

(75) Inventors: Franz Kilgert, Bayreuth; Jürgen Fichtel, Eckersdorf, both of (DE); Hans Widmer, Mollis (CH)

(73) Assignee: Wiessner GmbH, Bayreuth (DE)

( * ) Notice: Subject to any disclaimer, the term of this patent is extended or adjusted under 35 U.S.C. 154(b) by 0 days.

(21) Appl. No.: 09/538,235

(22) Filed: Mar. 30, 2000

Related U.S. Application Data

(63) Continuation of application No. PCT/EP99/03620, filed on May 26, 1999.

(30) Foreign Application Priority Data

May 27, 1998 (DE) .............................................. 198 23 694

(51) Int. Cl.⁷ .................................................. B65G 45/22
(52) U.S. Cl. ............................ 198/495; 198/494; 198/831
(58) Field of Search .................................... 198/494, 495, 198/496, 831; 15/256.52

(56) References Cited

U.S. PATENT DOCUMENTS

| | | | |
|---|---|---|---|
| 4,073,376 | * 2/1978 | Krooss | 198/496 X |
| 4,860,883 | 8/1989 | Knaul et al. | 198/495 |
| 4,887,708 | * 12/1989 | Brown et al. | 198/831 |
| 5,497,872 | * 3/1996 | Pennino | 198/496 X |

FOREIGN PATENT DOCUMENTS

| | | |
|---|---|---|
| 36 37 340 | 11/1986 | (DE) . |
| 43 15 021 | 11/1994 | (DE) . |
| 2 174 350 | 11/1986 | (GB) . |

* cited by examiner

*Primary Examiner*—James R. Bidwell
(74) *Attorney, Agent, or Firm*—Arent Fox Kintner Plotkin & Kahn PLLC

(57) ABSTRACT

A cleaning apparatus (1), to clean a conveyor belt (3) curving in its main plane, comprises a cleaning drum (9) of which the diameter at its end (9i) adjacent to the belt's inner edge (3i) is smaller than its diameter at its end (9a) adjacent to the outer edge (3a).

9 Claims, 2 Drawing Sheets

CLEANING DEVICE FOR A CURVED CONVEYOR BELT

CROSS REFERENCE TO RELATED APPLICATION

Figure 1:
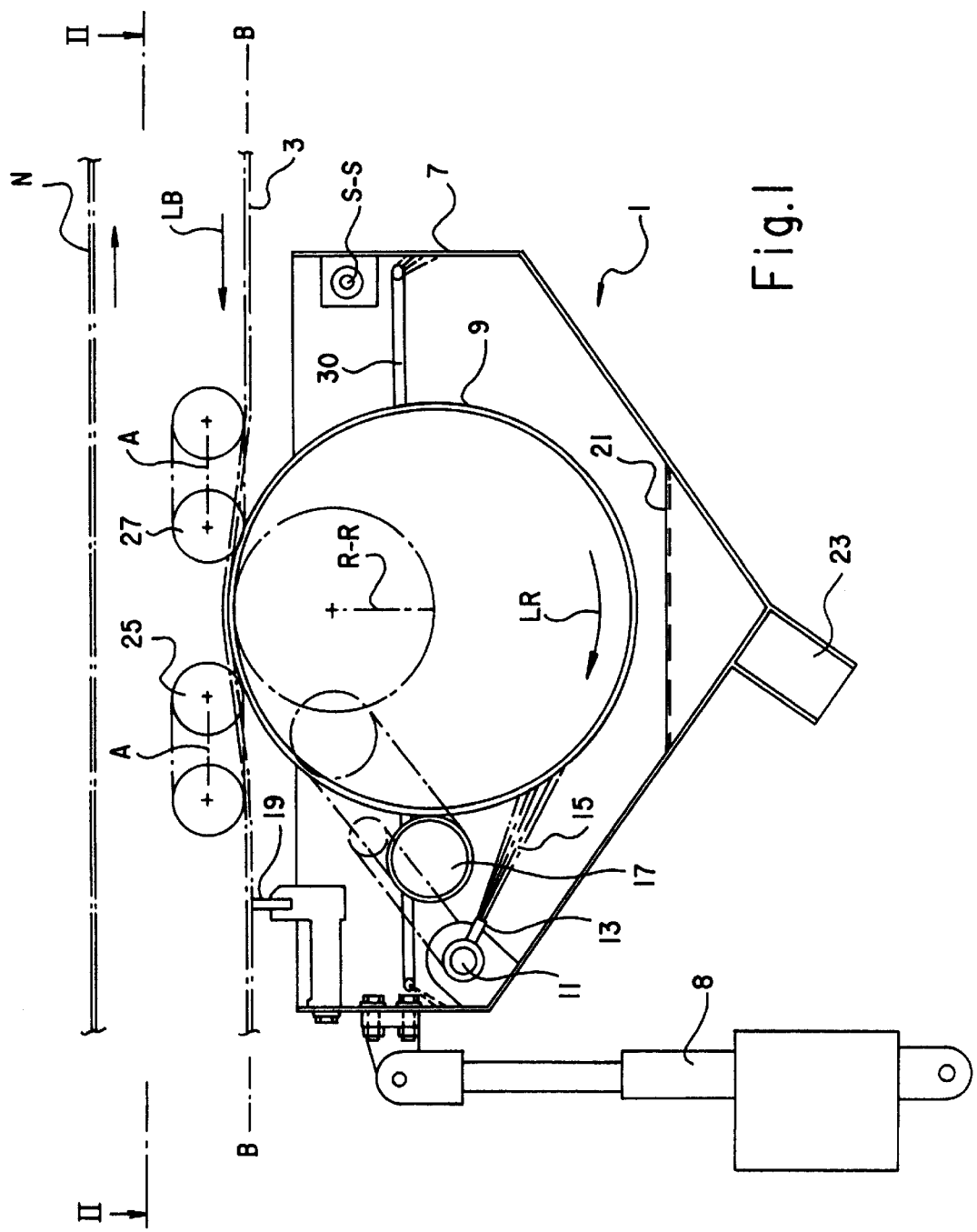

This application is a continuation of International Application PCT/EP99/03620, filed May 26, 1999, and designating the U.S.

The invention relates to apparatus cleaning an endless belt and comprising a rotationally driven cleaning drum pressed against the conveyor belt.

The German patent document 36 37 340 discloses equipment of this kind which comprises a cylindrical cleaning drum to clean an endless conveyor belt guided in a straight line. To a growing extent, curving conveyor belts moving in their main planes along a curve, or flat-annular conveyor belts, have come into use, which act for instance as connecting means between straight conveyor belts running at an angle to each other. Such curving conveyor belts must be regularly and thoroughly cleaned, especially in the foodstuff industry.

Accordingly it is the object of the present invention to create cleaning apparatus which is appropriate to uniformly clean a conveyor belt running along a curve in its main plane.

The diameter of the cleaning drum of the apparatus of the invention therefore is smaller at said drum's end adjacent to the conveyor belt's curved inside edge than at its end adjacent to the said curve's outside edge.

As a result, the relative speed between the drum surface and the conveyor belt is substantially constant over the width of the belt and thereby this belt is cleaned uniformly.

Preferably the cleaning drum shall be conical, the local radii along the length of this cleaning drum being at a substantially constant ratio to the corresponding radii across the width of said belt.

If the conveyor belt's surface to be cleaned is not planar, but instead is contoured in the longitudinal belt direction, for instance comprising a longitudinal indentation, the surface contour of the cleaning drum may be matched in complementary manner to the contour of belt surface to be cleaned, in which case this contoured surface can be superposed on the basic conical shape of the said drum.

Preferably a plurality of spray nozzles to spray cleaning fluid on the cleaning drum are mounted in a row running inside the belt's curve at an acute angle to the axis of rotation of the cleaning drum. As a result the distance between the cleaning drum and the spray nozzles may be kept substantially constant. The nozzles may be affixed directly to a supply manifold pipe.

Preferably a stripping bar is mounted transversely to the direction of belt motion in contact with said belt, and, as seen in the direction of said motion, behind the cleaning drum. This design assures that any residual particles and cleaning fluid still adhering to the belt surface when beyond the cleaning drum can be stripped off and be fed back into a housing mounted underneath.

A depressing roller is preferably mounted on the conveyor-belt side away from the cleaning apparatus and offset from the cleaning drum relative to the belt's direction of motion, the axis of rotation of said depressing roller being radial to the conveyor belt's curvature as seen in the direction to the main belt plane. This design allows depressing the belt uniformly across its full width on the cleaning drum.

An annular conduit with spray apertures is preferably mounted at the upper housing edge to clean both the housing inside surfaces and the integrated components. Adhering solid particles are removed by automatic flushing and thereby assure the required sanitation.

A preferred embodiment of the invention is elucidated below in relation to the attached Figures.

Figure 2:
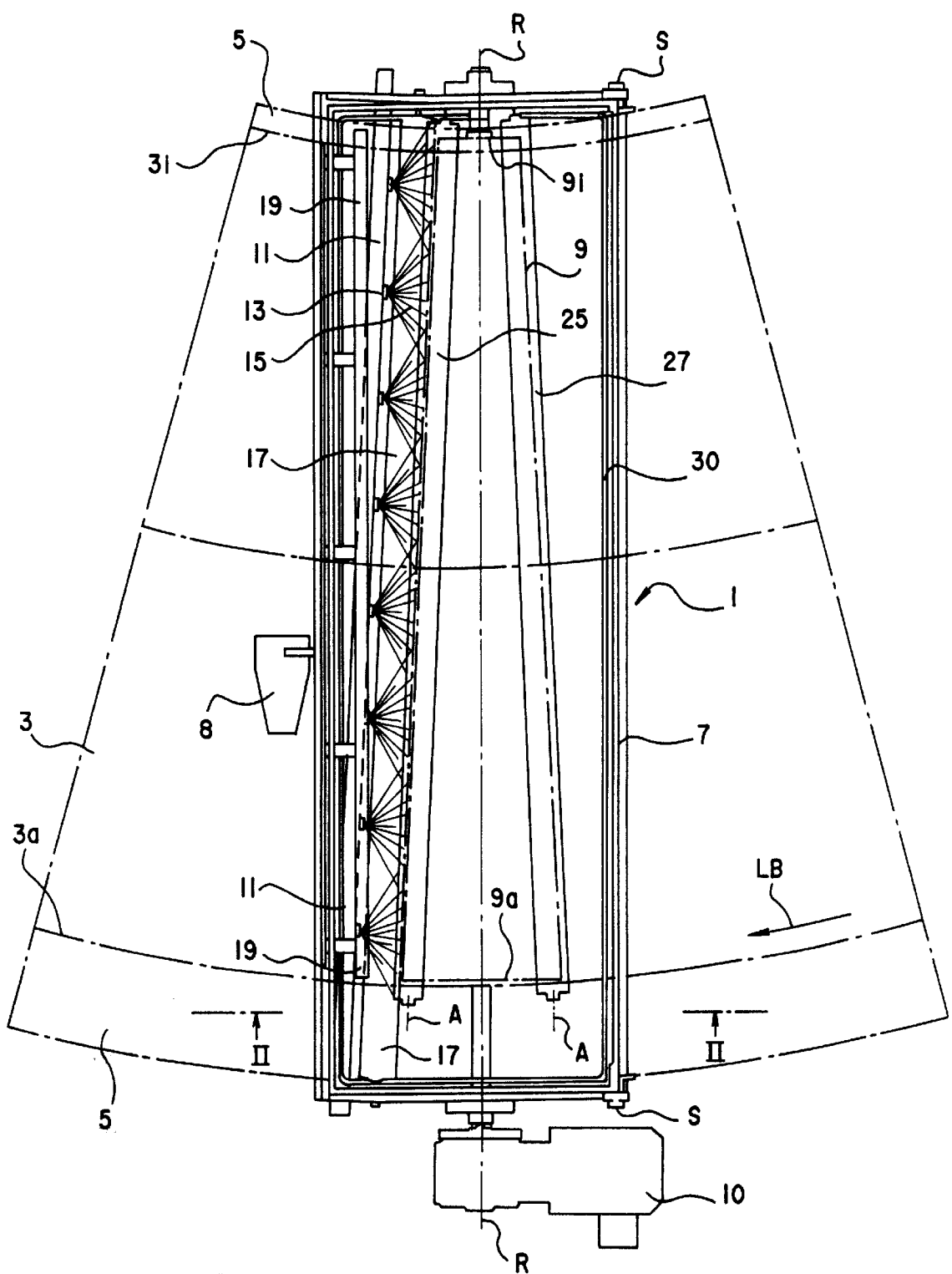

FIG. 1 is a cross-sectional view of the cleaning apparatus along line I—I in FIG. 2, and FIG. 2 is a topview of this apparatus along line II—II of FIG. 1 but at another scale.

In FIG. 1, a cleaning apparatus 1 is mounted underneath a closed-loop conveyor belt and serves to clean from below the belt segment 3 on its return trip in the direction LB. The overall shape of the conveyor belt is a flat annulus in this embodiment which runs on the cleaning apparatus 1 in its main belt plane BB along a curve shown in FIG. 2 and thereby is fitted with an inner edge 3$i$ of the curvature and an outer edge 3$a$ of that curvature. The belt 3 is bounded laterally by a conveyor-belt frame 5.

An elongated housing 7 of the cleaning apparatus 1 is open upward and like a funnel downward and substantially runs radially to the curving path of the conveyor belt 3, furthermore can be lowered by an adjusting element 8 about a shaft S—S running along a longitudinal edge of the housing 7.

A cleaning drum 9 coated for instance with felt and receiving cleaning fluid is supported in the housing 7 so as to be rotatably supported about its axis R—R and being removable from said housing; in operation said cleaning drum 9 is driven in rotation, by a drive means 10, opposite the direction of displacement L-B of the belt segment 3, namely in the direction of the arrow LR. To attain uniform relative speed across the full width of the belt between the conveyor belt 3 and the cleaning drum 9, the cleaning drum 9 is made conical, and as a result its end 9$i$ closer to the belt's inside-curved edge 3$i$ is of a lesser outside diameter that its end 9$a$ closer to the edge 3$a$ nearer the outside curve.

A pipe 11 (a nozzle manifold) for the cleaning fluid (in this instance an aqueous liquid) is affixed in the housing 7 and bears a plurality of nozzles 13 each spraying flat jets of liquid 15 on the cleaning drum 13 in such a way that the cleaning jet 15 impinges at an acute angle and opposite the direction LB of the cleaning drum 9 on that part of said drum which is situated underneath its axis R—R. Accordingly flushed-away solid particles drop directly into the funnel-shaped housing 7 to reach a discharge means 23. The spacing of the nozzles 13 from the surface of the cleaning drum 9 is substantially constant. The cleaning fluid furthermore may also be in the form of a gas or steam.

An elastically supported cylindrical sealing roller 17 rests against the cleaning drum 9 between the cleaning-fluid jets 15 and the conveyor belt 3 as seen in the direction of motion LB of this cleaning drum 9, said sealing roller 17 squeezing excess cleaning fluid from the cleaning drum 9.

Moreover a stripping bar 19 is affixed in the housing 7 above the pipe 11 and in operation rests against the belt segment 3 to be cleaned, namely the lower one, and moves in the direction LB, in order to strip off any solid particles that still adhere to the conveyor belt 3. The cleaning fluid dripping off the stripping bar 19 passes through the funnel-shaped housing 7 underneath into the discharge 23. Upon appropriate filtering and processing, the cleaning fluid is then fed back to the washing apparatus or it is selectively and directly discharged as waste.

On the side of the lower belt segment 3 which is away from the cleaning drum 9, compression rollers 25, 27 are rotatably supported at the conveyor belt's frame 5 and, as seen in the direction of belt motion LB, are situated in front of and behind the compression site of the cleaning drum 9; said compression rollers 25, 27 support the belt 3 against the pressure applied by the cleaning drum 9. The particular axes A—A of the compression rollers 25, 27 coincide in to the direction of the belt's curved inner edge 3i.

An annular and inside conduit 30 fitted with a plurality of spray apertures is mounted on the upper edge of the housing 7 and implements automatic spraying of the cleaning fluid. In this manner the inside surfaces of the housing 7 as well as the integrated components are kept sanitarily clean. The sprayed cleaning fluid moves through the discharge means 23 toward a Is filtering and processing stage or it is selectively removed as waste.

What is claimed is:

1. An apparatus for cleaning an endless conveyor belt (3), comprising at least one cleaning drum (9) driven in rotation and compressed against the conveyor belt (3), adhered, for cleaning a curved conveyor belt (3) curving in its main plane (B—B), an outside diameter of an end (9i) of said cleaning drum (9) adjacent to an inner edge (3i) of said conveyor belt is less than an outside diameter of said cleaning drum (9) at an end (9a) adjacent to an outer edge (3a) of said conveyor belt.

2. Apparatus as claimed in claim 1, wherein the cleaning drum (9) is substantially conical.

3. Apparatus as claimed in claim 1, wherein along the length of the cleaning drum (9), local radii of the cleaning drum are in a substantially constant ratio to the corresponding local radii of the conveyor belt across a width of the conveyor belt.

4. Apparatus as claimed in claim 1, wherein in the direction orthogonal to the main belt plane (B—B), an axis of rotation (R—R) of the cleaning drum (9) runs radially to a curvature of the conveyor belt.

5. Apparatus as claimed in claim 1, wherein a circumferential contour of the cleaning drum complementarily matches a cross-sectional profile of a belt surface to be cleaned.

6. Apparatus as claimed in claim 1 wherein a plurality of spray nozzles (13) to spray cleaning fluid on the cleaning drum (9) are situated in a row subtending an acute angle with a axis of rotation (R—R) of the cleaning drum and pointing toward the inner edge (3i) of the belt (3).

7. Apparatus as claimed in claim 6, wherein a stripping bar (19) to strip off cleaning fluid and situated, with respect to a direction of motion (LB) of the belt (3) behind the cleaning drum (9), can be applied transversely to the direction of motion (LB) of the belt (3).

8. Apparatus as claimed in claim 1, wherein at least one depressing roller (25, 27) is rotatably supported on a side of the belt (3) that is away from the cleaning drum (9) and, with respect to a direction of motion (LB) of the belt (3), is offset from the cleaning drum (9), in order to support the belt (3) against the compression applied by the cleaning drum (9), and in that, with respect to a direction orthogonal to the main belt plane (B—B), an axis of rotation (A—A) of said at least one depressing roller (25, 27) runs radially to a curvature of the conveyor belt (3).

9. Apparatus as claimed in claim 1, wherein the cleaning drum (9) is received in a housing (7) that is fitted at its sidewalls with pipe (30) to spray cleaning fluid on inside surfaces of said housing.

* * * * *